(No Model.) 3 Sheets—Sheet 1.

C. B. COTTRELL.
FEEDING APPARATUS FOR PRINTING MACHINES.

No. 431,201. Patented July 1, 1890.

Witnesses:

Inventor:

(No Model.) 3 Sheets—Sheet 2.
C. B. COTTRELL.
FEEDING APPARATUS FOR PRINTING MACHINES.
No. 431,201. Patented July 1, 1890.
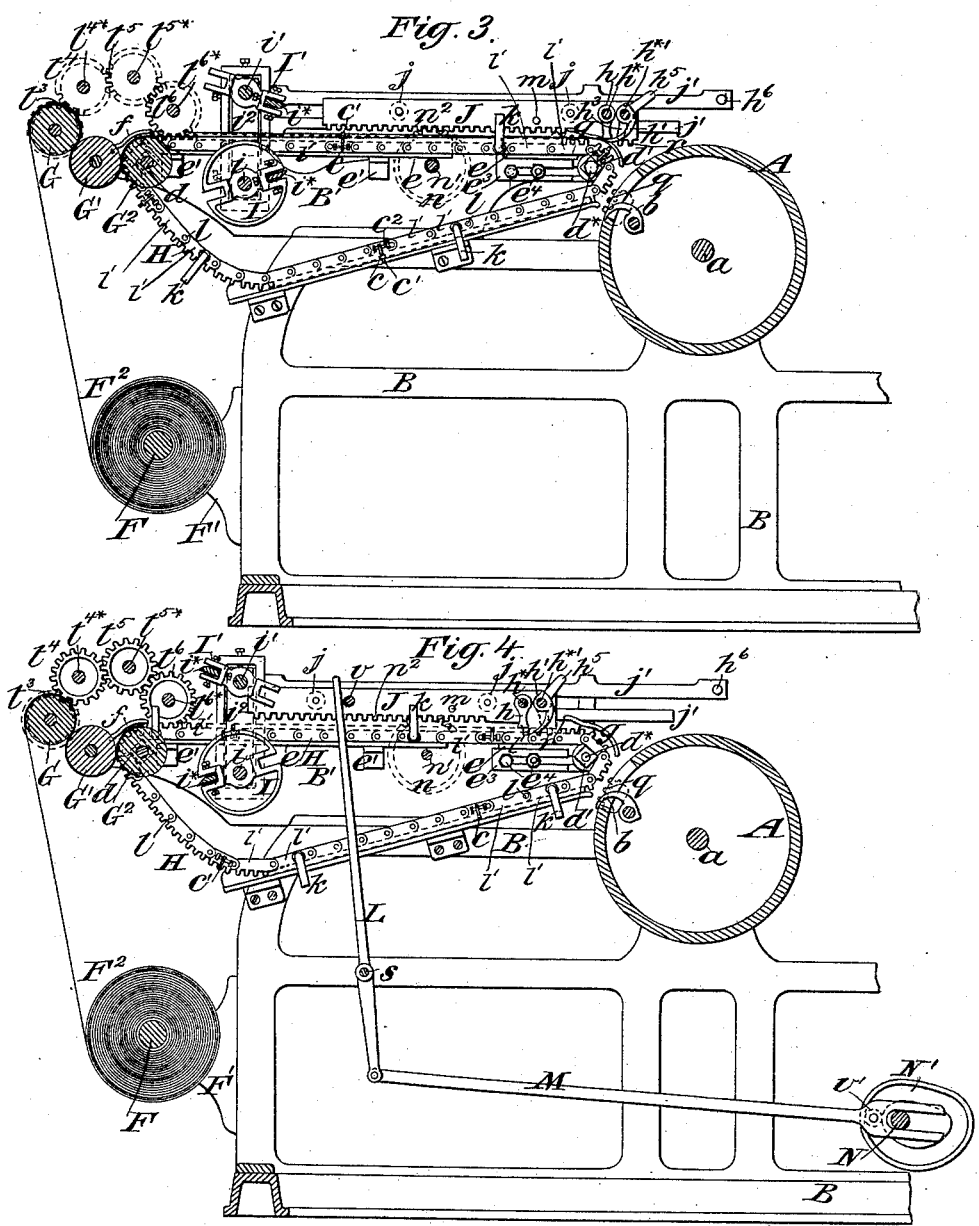

(No Model.) 3 Sheets—Sheet 3.
C. B. COTTRELL.
FEEDING APPARATUS FOR PRINTING MACHINES.

No. 431,201. Patented July 1, 1890.

Witnesses:

Inventor:
Calvert B. Cottrell
by attorneys
Brown & Griswold

UNITED STATES PATENT OFFICE.

CALVERT B. COTTRELL, OF WESTERLY, RHODE ISLAND.

FEEDING APPARATUS FOR PRINTING-MACHINES.

SPECIFICATION forming part of Letters Patent No. 431,201, dated July 1, 1890.

Application filed December 6, 1889. Serial No. 332,797. (No model.)

*To all whom it may concern:*

Be it known that I, CALVERT B. COTTRELL, of Westerly, in the county of Washington and State of Rhode Island, have invented a new and useful Improvement in Feed Mechanism for Printing-Machines, of which the following is a specification, reference being had to the accompanying drawings.

This invention relates to what is known as a "roll-feed," the paper being supplied to the printing-machine from a roll or continuous web and cut into sheets, which are sucessively fed to the impression-cylinder.

In my United States Letters Patent No. 422,572, dated March 4, 1890, there is described and claimed the combination, with the impression-cylinder of a printing-machine, of feed-rolls for feeding a continuous web of paper, a cutter for cutting said web into sheets, an endless carrier for carrying the sheets so cut, and a reciprocating carriage for receiving the sheets from said endless carrier and presenting them to the impression-cylinder; and there is also described and claimed a combination of such impression-cylinder, feed-rolls, cutter, endless carrier, and reciprocating carriage, means of transmitting motion from the said endless carrier to the said reciprocating carriage, and means of giving to the said reciprocating carriage a gradually-accelerated movement to bring its speed up to the surface speed of the cylinder; but the combinations as described and claimed in that application only provide for cutting the web into sheets of one certain length.

The object of the present improvement is to provide for cutting sheets of different lengths.

The nature, construction, and operation of this improvement will be first described with reference to the drawings, and its novelty will be afterwards pointed out in the claims.

Figures 1, 2:
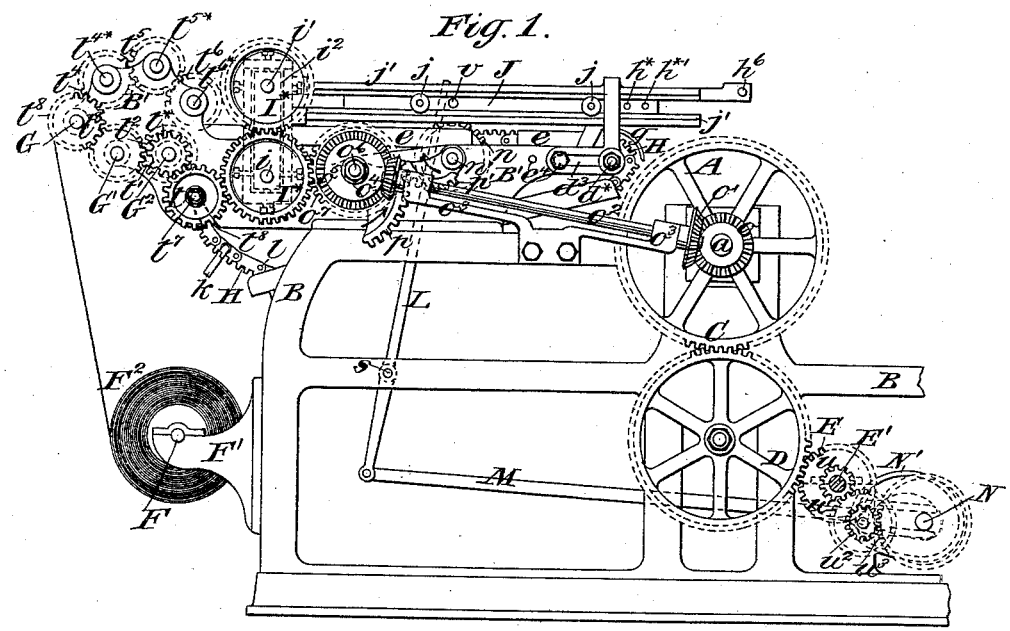
Figure 5:
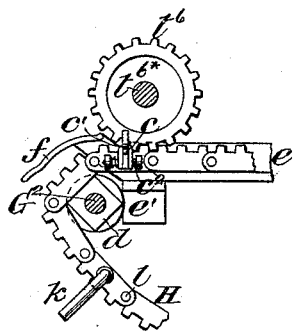
Figure 6:
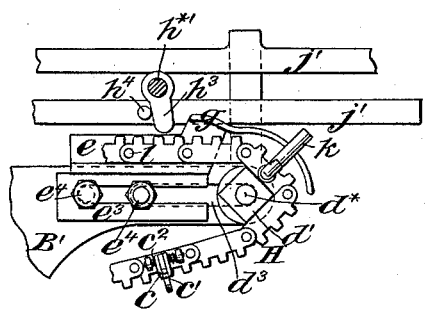

Figure 1 represents a side elevation of the impression-cylinder of a two-revolution printing-machine and of the feed mechanism applied thereto. Fig. 2 is a plan corresponding with Fig. 1. Fig. 3 represents a vertical section corresponding with Fig. 1, about in the line $x\ x$ of that figure. Fig. 4 represents a vertical section about in the line $y\ y$ of Fig. 2, representing the endless carrier and reciprocating carriage and their appurtenances in a position different from that represented in Figs. 1 and 3. Figs. 5, 6, 7, and 8 are detail views, which will be hereinafter described.

Similar letters of reference designate corresponding parts in all the figures.

A designates the impression-cylinder of a two-revolution printing-machine, the shaft $a$ of which is supported in the side frame B of the machine and may be driven in any suitable manner—as, for instance, by spur-gearing C D E from the main shaft E' of the machine. The said cylinder is furnished with grippers $b$, which may be of the usual kind for taking the paper from the feeding apparatus.

F is a roller, the journals of which are supported in bearings in brackets F', secured in the side frames B, for carrying the roll or continuous web of paper $F^2$ to supply the machine.

G G' $G^2$ are feed-rollers arranged above the roller F, their journals running in bearings in side frames B', erected upon the main side frames B.

H H are two endless toothed racks, which, with the series of grippers $c\ c'$, attached thereto, constitute the endless carrier, to which the paper is transferred by the feed-rollers G G' $G^2$ as it is drawn by the said rollers from the roll $F^2$.

I I' are rotary cutter-stocks fastened on shafts $i\ i'$ and carrying cutting-blades $i^*\ i^*$, which constitute a rotary cutter or rotary shears for cutting into sheets the web of paper taken from the feed-rollers G G' $G^2$ by the grippers $c\ c'$ of the endless carrier. These shafts $i\ i'$ are geared together to rotate synchronously by gears $I^*$.

Figure 7:
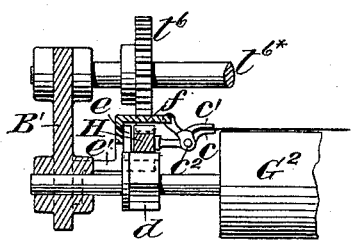
Figure 8:
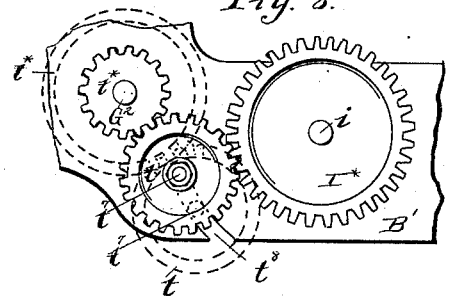

J is the reciprocating carriage for receiving from the endless carrier H $c\ c'$ the sheets cut by the rotary cutter or shears from the web $F^2$ and presenting said sheets to the grippers of the impression-cylinder. The endless toothed racks H of the endless carrier are composed of short toothed sections or links pivoted together by pins $l$, and they are carried by two short polygonal rollers $d$, which are loose on the shaft of the feed-roller $G^2$, and two similar polygonal rollers $d'$, which are fitted to turn freely on studs $d^*$, secured in the frames B' B' near the impression-cylinder A. One of the rollers $d$ is shown dotted in Fig. 3, and one of those $d'$ is shown in full in said figure. All of said rollers are visible in plan in Fig. 2. One of each is shown on a larger scale in Figs. 5 and 6 of the drawings, which represent, respectively, the turning portions of one of the endless carriers and its appurtenances on a larger scale than Figs. 1, 2, and 3, and a side view of one of the rollers $d$ is represented in Fig. 7, which is a transverse sectional view corresponding with Fig. 5. The said endless racks are driven through the feed-rollers by a train of gearing, which will be hereinafter described, so that the speed of the endless carrier will always correspond with that of the feed of the web of paper by the rollers, whatever may be the speed of the latter.

The upper courses of the two endless racks H are arranged to run on fixed horizontal guides $e$, supported on brackets $e'$, which are secured to the side frames B'. The grippers $c\ c'$, attached to the two racks H at opposite points, project inward from the said racks for the purpose of taking hold of the edges of the web of paper. The lower jaws $c$ of the said grippers are rigidly secured to their respective racks. The upper jaws $c'$ are pivoted, as shown at $c^2$ in Fig. 7, to the lower jaws $c$, and are furnished with outward projections or tail-pieces, to be operated upon by passing under stationary cams $f\ g$, (see Figs. 5 and 6,) which are secured to or formed upon the brackets $e'$, for the purpose of producing the opening of the said grippers at the proper time for receiving the web of paper from the feed-rollers and of delivering the paper after it has been cut into sheets to the reciprocating carriage J. For the purpose of closing the jaws $c'$, coiled springs are applied between them and the jaws $c$ in a well-known manner.

The distance between the grippers on each rack H lengthwise of the rack corresponds with the length of the sheets to be cut, and this distance must be changed for cutting different lengths of sheets. The necessary changes for this purpose within certain limits may be effected with links of uniform length by putting in or taking out links, or they may be effected by using links of different lengths and substituting one or more longer for one or more shorter links in each of the spaces between two sets of grippers when sheets of greater length are to be cut and printed, or by substituting a shorter for a longer link in each of said spaces when shorter sheets are to be cut and printed. The last-mentioned method of varying the distance between the grippers is illustrated in Figs. 3 and 4, where there are shown between every two sets of grippers two changeable links $l'$, longer than all the rest. In order to compensate for the change made in the length of the endless racks by inserting or taking out links or substituting longer or shorter links $l'$, the studs $d^*$, instead of being secured in fixed positions in the frames B', are made adjustable horizontally in slots $d^3$, (see Figs. 1 and 5,) provided in the upper side frames B', and are capable of being secured in said slots in the necessary position to keep the upper courses of the racks straight. As the guides $e$ should be brought as close as possible to the turn of the racks over the rollers $d'$, the said guides are each made in two sections, of which one, instead of being secured in the brackets $e'$, is made in the same piece with a slotted plate $e^3$, which is bolted to its respective side frame B', by means of bolts $e^4$, in such manner as to permit of its horizontal adjustment.

The reciprocating carriage J consists of a rectangular frame arranged above the endless carrier, and is furnished on its sides with rollers $j$, to run between fixed horizontal ways $j'$, which are supported upon and above the said side frames B'. This reciprocating carriage has at the end nearest the impression-cylinder a set of grippers $h\ h'$ for taking the sheets from the endless carrier and presenting them to the grippers of the impression-cylinder. The jaws $h$ of these grippers are firmly attached to the bar $h^*$, which is firmly secured in the side bars of the said reciprocating carriage J and forms a rigid part of the said carriage. The jaws $h'$ are all affixed to the bar $h^{*\prime}$, which is pivoted in the sides of the said carriage. A spring $h^2$, (see Fig. 2,) coiled around this bar $h^{*\prime}$, serves to close the said grippers. On one end of the last-mentioned bar there is an arm $h^3$ for opening the said grippers to receive the sheet from the endless carrier when the said arm is brought by the movement of the said carriage into contact with a stationary pin $h^4$ (see Fig. 6) on one of the fixed horizontal ways $j'$. There is also provided on the said bar another arm $h^5$ for opening the said grippers to allow the cylinder-grippers to take the sheets therefrom when the said arm is brought by the movement of the carriage into contact with a stationary pin $h^6$, (see Fig. 3,) provided on one of the upper ways $j'$.

The reciprocating carriage J has a movement toward and partly over the impression-cylinder given to it, first by means of tappets $k$, attached to the endless carrier acting against lugs $m$ on the side bars of the carriage; second, by a lever L, working on a fixed fulcrum $s$, (see Figs. 1 and 4;) third, by spur-gears $n$ on a shaft $n'$, supported in bearings on the side frames B', the said spur-gears gearing with toothed racks $n^2$ on the lower edges of the said side bars, and, fourth, by a few teeth on the cylinder itself, as shown at $q$ in Figs. 3 and 4, which pass into and out of gear with the teeth $r$ on one of the side bars of the said carriage, the said teeth being represented in Fig. 3 as slightly below the racks $n^2$. The first part of the said movement is at a speed corresponding with the continuously-uniform speed of the endless carrier, which is less than the surface speed of the impression-cylinder. The fourth part of the said movement is at the speed of the impression-cylinder. The second part of the said movement is at a speed which must be at least equal to and is generally greater than that of the endless carrier; and the third part of said movement is at a still greater speed, which is gradually accelerated until it reaches the speed of the cylinder. The means of operating the shaft $n'$, hereinabove mentioned, and of operating the lever L to move the carrier J toward the cylinder, will be hereinafter more fully described. The movement of the reciprocating carriage in the reverse direction, or away from the cylinder, is produced by a spring $n^4$, coiled around the said shaft $n'$, and secured at one end to said shaft and at the other end to one of the guides $e$.

The rotary cutter-stocks I I' and cutting-blades $i^* i^*$ may be such as are the subject-matter of my Letters Patent No. 391,949, dated October 30, 1888. The shafts $i\ i'$ of the said cutter are arranged above and below the upper courses of the endless carrier and supported in adjustable bearings $i^2$ on the framing of the machine, the said shafts being so arranged that the cutter acts upon the web of paper while the latter is carried between them by the endless carrier.

It will be understood that the speed of the rotary cutter must bear a fixed relation to the speed of the cylinder, whatever be the length of the sheet, and that in a two-revolution press the cutter must operate once for every two revolutions of the cylinder. It will also be understood that the speed of the feed-rollers and of the endless carrier must be changeable relatively to the speed of the cutter in order to provide for cutting sheets of different lengths. The shafts of the rotary cutter are represented as deriving an unvarying motion from the cylinder-shaft $a$ through a bevel-gear $o$ fast on the said shaft, the said bevel-gear gearing with and driving a bevel-gear $o'$ on one end of an inclined shaft $o^2$, which works in fixed bearings in a bracket $o^3$, attached to the outside of one of the main side frames of the machine, the said shaft $o^2$ being furnished at its other end with a bevel-gear $o^4$, gearing with and driving a bevel-gear $o^5$, which rotates on a fixed stud $o^6$, secured in one of the side frames B'. To this bevel-gear $o^5$ is secured a spur-gear $o^7$, which gears with and drives the spur-gear I* on the lower cutter-shaft $i$. This last-mentioned spur-gear I* drives the feed-rollers G G' G² and the endless carrier through a train of gearing $t\ t^*\ t'\ t^2\ t^3\ t^4\ t^5$. The first gear $t$ of this train turns loosely on a fixed stud $t^7$, secured in one of the upper side frames B', and receives motion directly from the spur-gear I*, last mentioned. The said gear $t$ gears directly with the spur-gear $t^*$, which is fast on the shaft of the feed-roller G², and so drives the said feed-roller. The said feed-roller also carries a spur-gear $t'$, which gears with a spur-gear $t^2$, of the same size, on the shaft of the feed-roller G', and the said gear $t^2$ gears with a gear $t^3$, of the same size, on the shaft of the feed-roller G. Two other gears $t^3$, of the same size, on the shaft last mentioned, are geared with two $t^4$, of the same size, on a shaft $t^{4*}$, supported in bearings in the side frames B', and the gears $t^4$ are geared with two others $t^5$, of the same size, on a similarly-supported shaft $t^{5*}$, and these latter gears are geared with two gears $t^6$, of the same size, on a similarly-supported shaft $t^{6*}$. The gears $t^6$ are also geared with the teeth on the racks H of the endless carrier. The gears $t'\ t^2\ t^3\ t^3\ t^4\ t^5\ t^6$ being all of equal size and the feed-rollers being of a circumference corresponding with the pitch-line of the gears $t^6$, the surface speed of the feed-rollers and that of the endless carrier will always be the same. This speed is regulated according to the length of sheet to be fed by the size of the gear $t^*$ on the shaft of the feed-roller G², and to adapt the machine to cut and print longer or shorter sheets this wheel is changed for one of a larger or smaller size. To provide for the larger or smaller gear $t^*$ being driven from the spur-gear I* on the lower cutter-shaft, the stud $t^7$, which carries the spur-gear $t$, is made adjustable toward and from $t^*$ in a curved slot $t^8$ (shown in dotted outline in Fig. 1) in the side frame B', in which the said stud is capable of being fixed in different positions. This changeable gearing is shown more plainly in Fig. 8, which is a side view of the said gearing and part of the frame B on a larger scale than Fig. 1, and in which a smaller gear $t^*$ is shown in bold outline and a larger one in dotted outline, the gear $t$ and its stud $t^7$ being shown in full outline in position for the said gear $t$ to gear with the smaller gear $t^*$, and the position of the said stud and the pitch-line of its gear $t$ for gearing with the larger gear $t^*$ being shown in dotted outline.

I will now describe the means of producing the second and third parts, hereinbefore mentioned, of the movement of the carriage J toward the cylinder.

The lever L, which produces the second part of said movement by the action of its upper end against a pin or projection $v$ (see Fig. 4) on the carriage, has its lower end connected with a rod M, which is slotted to run on a cam-shaft N, which is driven by gearing $u\ u'\ u^2\ u^3$ from the main or driving shaft E' of the machine, the said shaft being provided with a cam N' to operate on a roller $v'$ (see Fig. 4) on the said rod M, and so produce the movement of the lever at the proper time. The shaft N, in a two-revolution-cylinder printing-machine, may be the same which carries the cam for depressing the impression-cylinder.

The shaft $n'$, hereinbefore mentioned, carrying the spur-gears $n$ for producing the third part of the aforesaid movement, is driven through two eccentric toothed sectors $p\ p'$, of which $p$ is caused to rotate continuously, being secured to the spur-gear $o^7$ and bevel-gear $o^5$, hereinbefore mentioned, and $p'$ is fast on the shaft $n'$. The shortest radius of the sector $p$ corresponds with the longest radius of the sector $p'$, and hence as in its continuous rotation the sector $p$ comes with its shortest radius into gear with the sector $p'$ at its longest radius (as will be understood by reference to the arrows in Fig. 1, indicating the direction of the rotation of the sectors) the shaft $n'$, the spur-gears, and the carriage will be driven through the said sectors with a gradually-increasing velocity. The longest radius of $p$ and the shortest radius of $p'$ are relatively so proportioned as to drive the carriage at the same speed as the surface speed of the cylinder.

Having now described the operations of the several parts of the machine, I will, in conclusion, describe the operation of feeding the continuous web of paper to the endless carrier, the cutting of the web into sheets while on the said carrier, the transference from the said carrier to the reciprocating carriage, and the presentation of the sheet by said carriage to the cylinder. The web of paper passes over the feed-roller G and over the feed-roller $G^2$. When passing over the roller $G^2$, the side grippers $c\ c'$ on the endless racks of the carrier take the edge of the paper and carry it between the rotary cutter $i^*$, which cuts it into proper lengths to form sheets, leaving the back end of each sheet free and the front end in the side grippers, so that one pair of grippers on each endless rack has hold of each sheet near its front edge. The side grippers $c\ c'$ carry the front edge of the sheet to the grippers $h\ h'$ of the reciprocating carriage while the latter is stationary in the position to which it has been carried back by the spring $n^4$, before mentioned, in which position it may be stopped by any suitable means, but in the example represented is stopped by the pin $v$, hereinbefore mentioned as provided on the said carriage, coming against the lever L, which is at the time held stationary by the concentric portion of its operating-cam N′ being in operation on the roller $v'$. The grippers $h\ h'$ are at this time held open by the arm $h^3$ being in contact with the pin or projection $h^4$ on the ways $j'$. The reciprocating carriage is then started by the tappets $k$ of the endless carrier coming in contact with its lugs $m$, and the grippers $h\ h'$ are closed by the spring $h^2$ to take a sheet. The reciprocating carriage now moves with the endless carrier toward the cylinder until its pin $v$ is overtaken by the lever L, which has now been brought into operation by its cam N′. The lever now moving faster than the endless carrier drives the reciprocating carriage until the two eccentric toothed sectors $p\ p'$ are, as shown in Figs. 1 and 2, brought into gear by the continuous rotation of the sector $p$, and the simultaneous rotation of the sector $p'$, which is produced by the turning of the shaft $n'$ by the action of the toothed racks $n^2$ of the carriage upon the spur-wheels $n$, and the carriage is then driven by the said sectors at a gradually-accelerated velocity until its speed reaches that of the surface speed of the cylinder, when its teeth $r$ come into gear with the teeth $q$ on the cylinder, and its movement toward and over the cylinder is completed by the cylinder itself in such manner that perfect register of the sheet is insured. As the reciprocating carriage thus approaches the end of its movement, its grippers $h\ h'$ are opened by the arm $h^5$ on its gripper-bar $h^{*'}$ coming against the fixed pin $h^6$, leaving the sheet free to be taken by the cylinder-grippers. After the teeth $q$ on the cylinder pass beyond those $r$ on the reciprocating carriage the latter is left free to be returned by the action of the spring $n^4$ on the shaft $n'$ and its gears $n$ to the position shown in Fig. 4, to receive a new sheet from the endless carrier.

It has been hereinbefore mentioned that the speed of the feed-rollers and the endless carrier must be variable relatively to the speed of the cylinder and of the cutter in order to feed a greater or less length of paper to cut sheets of greater or less length. It will be obvious that for producing and feeding shorter sheets the endless carrier must move slower, and that for the longer sheets it must move faster. Now the cylinder moving at a uniform speed and the velocity of the third and fourth parts of the movement of the carriage, hereinbefore described, being always in the same proportion to the speed of the cylinder, the distance which the endless carrier moves, and which the reciprocating carriage would be moved by it before the toothed sectors $p\ p'$ come into gear to give the accelerated speed to the said carriage, will be less when the movement of the carriage is slower, as it is in cutting and feeding short sheets; hence if the speed of the endless carrier be such that it would move the reciprocating carriage fast enough to take it to the proper point in proper time for its accelerated movement to be commenced by the operation of the eccentric sectors the slower movement of the carrier necessary for the shorter sheets would not permit it to take the carriage to the proper point in time. It is for the purpose of compensating for this slower movement of the endless carrier, necessary for shorter sheets, that the cam-actuated lever L is introduced into the machine. This lever having a positive and unvariable movement always corresponding with that of the cylinder, will always bring the carriage to the proper point, whatever the length of the sheet may be, without requiring any adjustment of any part of the machine, except the change of the gear $t^*$ and the adjustment of the gear $t$ and the alteration of the length of the endless carrier, as hereinbefore described, to cut and feed sheets of different lengths.

What I claim as my invention, and desire to secure by Letters Patent, is—

1. The combination, with the impression-cylinder of a printing-machine, of an endless carrier for carrying a continuous web of paper toward said cylinder, a cutter geared with said cylinder to operate with unvarying speed relatively thereto for cutting said web into sheets while in said carrier, and changeable gearing between the cylinder and carrier for driving the carrier at different speeds relatively to the cylinder for the cutting of sheets of different lengths, substantially as herein described.

2. The combination, with the impression-cylinder of a printing-machine and a cutter geared with said cylinder to operate relatively thereto with an unvarying speed, of an endless carrier provided with grippers for the purpose of carrying the end of a continuous web of paper to said cutter and toward said cylinder, said carrier being changeable in length, substantially as herein described, between said grippers, a reciprocating carriage for receiving sheets from said endless carrier, changeable gearing, substantially as herein described, between said cylinder and said carrier, for driving said carrier at different speeds relatively to the said cylinder for the cutting of sheets of different lengths to be presented to said cylinder, tappets on said endless carrier for transmitting motion therefrom to said reciprocating carriage to drive the latter, and mechanism, substantially as herein described, for the purpose of continuing and completing the movement of the said reciprocating carriage toward the cylinder at a speed which is always in the same proportion to the speed of the said cylinder, substantially as and for the purpose herein set forth.

3. The combination, with the impression-cylinder of a printing-machine, of an endless carrier for carrying the end of a continuous web of paper, a cutter for cutting sheets from said web in said endless carrier, a reciprocating carriage for receiving sheets from said endless carrier, tappets on said endless carrier for transmitting motion from said endless carrier to said reciprocating carriage, a lever and a cam for actuating the same geared with the main shaft of the machine for continuing the movement of said carriage commenced by said carrier, and a train of gearing, including eccentric segments, between said carriage and the main shaft of the machine, for further continuing the movement of said carriage with an accelerated velocity, substantially as and for the purpose herein set forth.

4. The combination, with the impression-cylinder of a printing-machine and a cutter geared with said cylinder to operate relatively thereto with an unvarying speed, of the endless carrier consisting of toothed racks H H, provided with grippers for carrying the end of a continuous web of paper to said cutter and toward said cylinder, said racks being changeable in length between said grippers and geared with the cylinder by changeable gearing, the reciprocating carriage J, provided with grippers to take from said endless carrier the sheets cut from the web by the cutter, the tappets $k$ on said endless carrier for starting the said reciprocating carriage toward the cylinder, the lever L and the cam N' and connections for operating said lever for continuing the movement of said carriage, the rack $n^2$ on said carriage, the shaft $n'$ and the gears $n$ on said shaft gearing with said racks, and the eccentric sectors $p\ p'$, one on said shaft $n'$ and the other geared with said cylinder for the purpose of moving the said carriage toward the latter at an accelerated speed, substantially as herein described.

CALVERT B. COTTRELL.

Witnesses:
 FREDK. HAYNES,
 D. H. HAYWOOD.